Dec. 26, 1944.   A. B. LEONARD   2,366,117
BUTANE ISOMERIZATION PROCESS
Filed Oct. 5, 1942
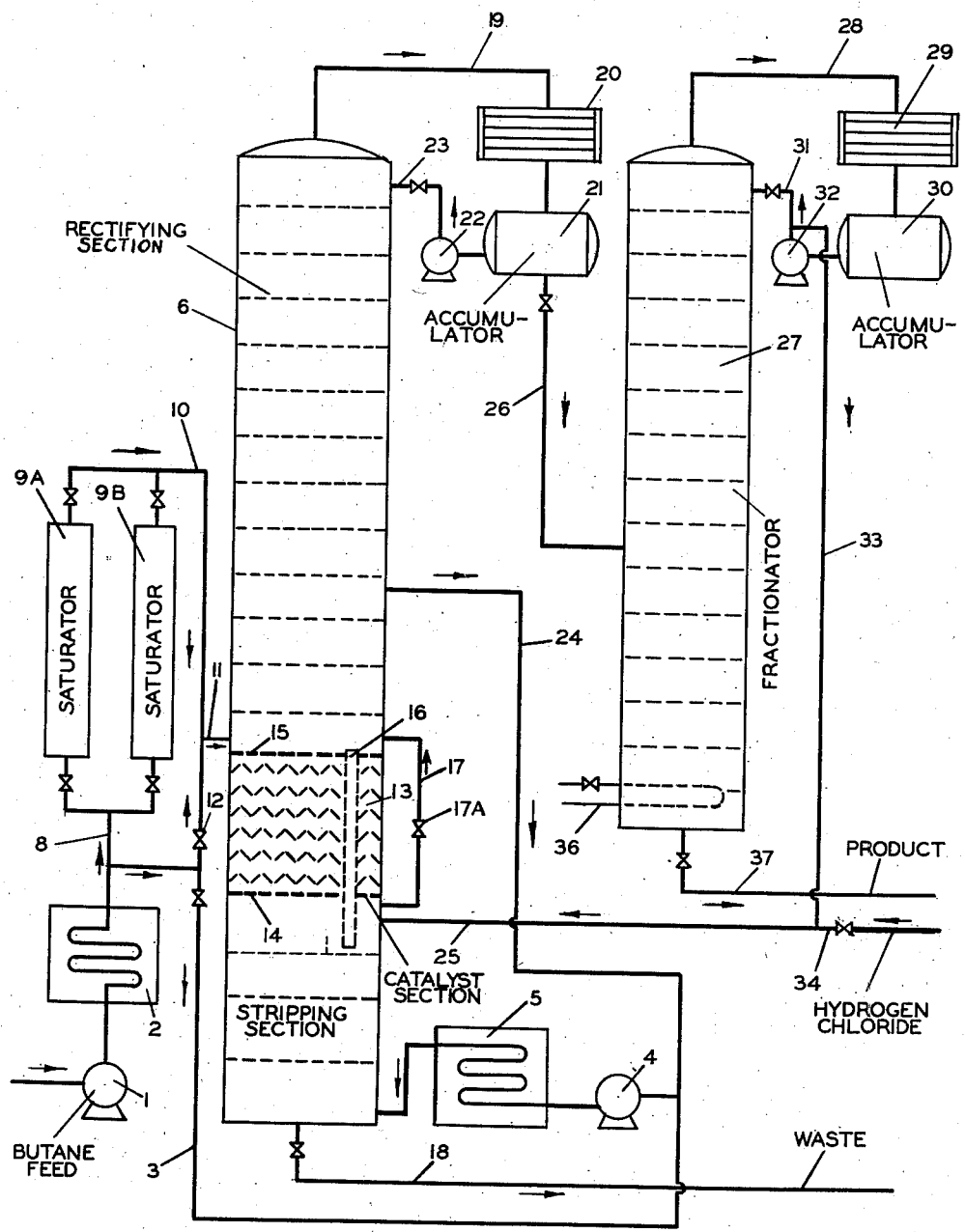
INVENTOR.
A. B. LEONARD
BY Hudson, Young and Yinger
ATTORNEYS Patented Dec. 26, 1944

2,366,117

UNITED STATES PATENT OFFICE 2,366,117

BUTANE ISOMERIZATION PROCESS

Ancel B. Leonard, Bartlesville, Okla., assignor to Phillips Petroleum Company, a corporation of Delaware Application October 5, 1942, Serial No. 460,842

3 Claims. (Cl. 260—683.5)

The present invention relates to a process for the production of isobutane from n-butane. More particularly the invention relates to a process of isomerizing n-butane to isobutane in the presence of a metal halide catalyst.

In the isomerization of n-butane to isobutane over a catalyst of aluminum chloride in the presence of hydrogen chloride as an activator, the principal reaction occurring is the conversion of n-butane to the lower-boiling isobutane. Also produced in the reaction are small amounts of propane and pentane, and a corrosive aluminum chloride sludge.

It has been proposed heretofore in hydrocarbon conversions to maintain the reacting hydrocarbons under vaporizing conditions in the reaction zone, i. e., in contact with the catalyst, whereby the liquid hydrocarbon coming in contact with the catalyst is at its boiling point at the pressure of operation. The hydrocarbon having a lower boiling point is vaporized and withdrawn from the catalyst in the form of vapors together with some of the hydrocarbon of higher boiling point in equilibrium therewith. The vapors may be partly or totally condensed and returned to the catalyst for further reaction. This principle has not to my knowledge been applied to the isomerization of butanes using aluminum chloride as a catalyst. The aluminum chloride and aluminum chloride sludge present in the reaction zone are very corrosive to heating elements, making it impractical to thereby supply heat to the reactants to maintain vaporizing conditions in the reaction zone. The present invention provides a novel and practical method of carrying out a hydrocarbon reaction in the presence of aluminum chloride and is particularly adapted to the conversion of n-butane to isobutane.

An object of this invention is to provide an improved process for the isomerization of hydrocarbons in the presence of a metal halide catalyst.

Another object of this invention is to provide an improved process for the conversion of n-butane to isobutane in the presence of aluminum chloride.

Still another object of this invention is to provide such a process in which the reactant hydrocarbons are contacted with the catalyst under distillation conditions.

A most important object of this invention is to provide an improved method of reboiling hydrocarbons undergoing reaction in the presence of a metal halide catalyst under distillation conditions, whereby the corrosive metal halide does not come into contact with the vaporizer.

Broadly the invention provides a method of, and apparatus for, isomerizing normal butane to isobutane over an aluminum chloride catalyst, removing the isobutane in the vapor form with rectification to return a substantial proportion of the butane to the catalyst, and with provision for supplying heat of vaporization to the hydrocarbons in the reaction vessel. The reboiling or heat of vaporization necessary is supplied without encountering the problem of corrosion of the heating elements by reason of a novel feature of my invention which will be better appreciated from a consideration of the drawing illustrating this feature, taken in consideration with the following detailed description of my invention.

The drawing is a diagrammatic view of the apparatus of my invention.

With reference to the drawing, the numeral 1 designates a pump arranged to take butane from a suitable source, not shown in the drawing, and pass it through the heater 2 as feed for the process. From the heater 2 the butane may be passed through the line 3, the pump 4, and the heater 5, into the base of tower 6, which tower will be more fully described hereinafter. Alternatively, the butane may be passed through the line 8 to saturators 9A or 9B, from which it may be admitted to tower 6 through the lines 10 and 11. Butane from the heater 2 may be admitted directly to the tower 6 through line 11 by operation of valve 12.

The tower 6 is divided into three main sections, the catalyst section 13, a rectifier section above the catalyst section, and a stripping section below the catalyst section. Solid aluminum chloride catalyst fills the catalyst section 13, being supported therein by the foraminous partition 14. A perforated plate 15 is provided above the catalyst section for distribution of liquid hydrocarbons over the aluminum chloride catalyst. A downpipe 16 extends through the catalyst bed to carry over liquid in excess of that which will pass through the catalyst bed proper. A vapor pipe 17 accommodates vapors from the stripping section in excess of the quantity which may be conveniently passed through the catalyst section. The relative distribution between the vapors in the catalyst bed and in the vapor pipe is controlled by valve 17A. The rectifying section of the tower above the catalyst bed is provided with suitable means for obtaining intimate countercurrent contact of liquid and vapor. Conventional bubble cap trays, for example, are preferable for use in this section; similarly, the stripping section below the catalyst section is provided with suitable means for obtaining multiple contact between liquids and vapors. Liquid from the base of the tower is withdrawn through the line 18. Vapors pass overhead from the tower through the line 19 to cooler 20, are condensed, and the condensate collected in the accumulator 21. The reflux to the tower is taken from the accumulator by a pump 22 and introduced into the top of the tower through line 23. At a point intermediate the catalyst section and the top of the tower a stream of liquid hydrocarbons may be withdrawn through the pipe 24 to the pump 4, vaporized in the heater 5, and introduced as vapors to the stripping section at the base of the tower. The heater 5 provides heat necessary to vaporize the product and reflux. Hydrogen chloride is introduced to the tower 6 through the line 25 entering the tower immediately below the catalyst section.

The products from the tower 6 containing hydrogen chloride are passed from the accumulator 21 through the line 26 to the fractionator 27. The fractionator 27 effects a separation of hydrogen chloride from the product, which comprises chiefly isobutane substantially free from hydrogen chloride. The hydrogen chloride admixed with propane, together with minor amounts of volatile hydrocarbons formed in the reaction, are taken overhead from the fractionator through line 28 and passed to the cooler 29. Condensate from the cooler 29 is collected in the accumulator 30, from which a part is returned to the top of the fractionator through line 31 by the pump 32 as reflux. The remainder of the overhead from the fractionator 27, containing the hydrogen chloride, is passed through line 33 from which it is introduced to the tower 6 through line 25. Fresh hydrogen chloride enters the system through the line 34. Heat is supplied to the base of the fractionator 27 by the heating coil 36. The higher-boiling hydrocarbon fraction comprising isobutane as product is withdrawn from the fractionator through line 37.

In operation, the catalyst section is provided with a charge of aluminum chloride catalyst suitably supported, as by admixture with Raschig rings. The saturators 9B and 9A are charged with aluminum chloride and serve to saturate the heated butane with aluminum chloride when in use. The saturators are used alternately, saturator 9A being on stream while saturator 9B is recharged with aluminum chloride and vice versa. The butane feed is heated to an elevated temperature, generally below the boiling point, by the heater 2. By manipulation of the control valves any or all of the butane may be passed through the saturator or passed directly to the tower through the valve 12 to the line 11. Any desired part of the butane feed may be passed through the line 3 to the heater 5 and admitted as vapor at the base of the tower. The heated butane entering the tower through the pipe 11 is distributed over the catalyst bed by the perforated plate 15. The liquid flowing downward through the perforations in the plate comes in contact with the aluminum chloride catalyst and with vapors rising from the stripping section of the tower. Liquid in excess of that which will pass through the perforations overflows into the pipe 16 and is carried thereby to the plate below the catalyst section. The catalyst section serves two functions; it acts as a catalyst chamber and as a packed section of the fractionator assisting in separation of the higher-boiling hydrocarbons from the lower-boiling hydrocarbons. The isobutane formed in the catalyst section is vaporized, together with normal butane in equilibrium with the normal butane-isobutane mixture, and these vapors pass upward into the rectifying section admixed with aluminum chloride vapors and hydrogen chloride. Vapors from the stripping section may by-pass the catalyst section through the vapor pipe 17 and are controlled by the valve 17A. Generally the catalyst section is operated to pass the butane feed as a liquid through the plate 15 into contact with the catalyst and with very little overflow through the pipe 16. Vapors from the stripping section may, under some operating conditions, interfere with the flow of liquid downward through the catalyst and cause excessive overflow through the downpipe 16. This is avoided by by-passing the vapors in excess of those which may be handled in the catalyst section through the vapor pipe 17.

Aluminum chloride sludge and some pentane are formed in the reaction, and being higher boiling than the butanes are concentrated by the stripping action of the vapors supplied to the base of the tower from the heater 5. The pentanes and aluminum chloride sludge are removed from the base of the tower through the pipe 18 as waste.

The aluminum chloride removed as sludge in the waste line 18 is replenished by aluminum chloride carried over from the saturator through the line 10. The butane is passed to the saturator through the line 8 continuously or intermittently to replenish the aluminum chloride in the catalyst section as needed. The isomerization taking place in the saturator is relatively negligible since the butane passes through the saturator in relatively small quantity or at a relatively high flow rate. Additional solid aluminum chloride may be added as necessary directly to the catalyst section of the tower.

The vapors passing upward from the catalyst section comprise aluminum chloride vapor, normal butane, isobutane, propane, and hydrogen chloride. Due to the rectifying action the aluminum chloride vapors and most of the n-butane are returned as liquid to the catalyst section. The aluminum chloride vapors, having the highest boiling point of any of the components in the mixture, are relatively readily condensed and fractionated from the hydrocarbons. I have found that five bubble plates will effect substantially complete removal of the aluminum chloride from the hydrocarbons. At a point in the rectifying section at which the aluminum chloride is substantially absent, a stream of hydrocarbons is withdrawn through the pipe 24. At this point the hydrocarbon mixture contains a fair percentage of n-butane in admixture with the isobutane. In accordance with my invention the mixture passed to the vaporizer 5 is substantially free from the corrosive aluminum chloride vapors which are destructive of heating elements. Obviously, the liquid withdrawn from the tower may be taken from any point in the tower 6 above the point at which the hydrocarbons are substantially free of aluminum chloride vapors. However, since the isobutane is desired as the overhead product of the tower and is undesirable in large percentages in the catalyst section, I prefer to withdraw the hydrocarbons at the lowest point in the fractionator where the hydrocarbons are substantially free from aluminum chloride vapors.

The hydrocarbons are further rectified to concentrate the isobutane at the top of the tower and the n-butane is returned to the catalyst section. Sufficient of the n-butane-rich hydrocarbon is withdrawn from the tower through line 24 to supply the heat for reboiling the column.

The propane formed in the reaction is taken overhead with the isobutane, some n-butane, and the hydrogen chloride. In the fractionator 27 the propane, together with any other very volatile hydrocarbons which may be present, and the hydrogen chloride are separated as overhead from the n-butane and isobutane, which latter are withdrawn as product from the bottom of the fractionator. Hydrogen chloride and propane admixed therewith are recycled to the tower 6 through the line 25. Excess propane may be removed from the system. When its concentration exceeds a predetermined value the propane appears in the bottom product of the fractionator; however, it may be removed when desirable by venting from the accumulator 30.

While the rectification of the hydrocarbons in the upper portion of tower 6 serves to concentrate the isobutane in the overhead product, I have found that it is generally undesirable to attempt to completely eliminate n-butane from the overhead product of tower 6. I have found that satisfactory results are obtained with about ten mol percent of the n-butane passing overhead with the isobutane and hydrogen chloride. I have found further that complete separation of n-butane from the overhead effluents of the tower 6 is impractical, if not actually impossible, in a rectification step in the presence of the effluent vapors from the catalytic isomerization.

My present invention has some very important advantages over similar processes in the prior art. A bed of solid aluminum chloride catalyst may be maintained in contact with n-butane at its boiling point. Pumping of corrosive aluminum chloride sludge for reboiling is not necessary. The tower in which the reaction takes place is reboiled without subjecting the heating apparatus to corrosive aluminum chloride or sludge thereof. Other advantages of my invention will be apparent to those skilled in the art.

While I have illustrated and described in detail a specific embodiment of my invention, other modifications will be suggested to those skilled in the art. While I have described the operation of my process with specific reference to aluminum chloride as the aluminum halide catalyst, the invention may be applied to isomerization in the presence of the other aluminum halide catalyst, particularly aluminum bromide and aluminum iodide. The foregoing detailed description of the preferred embodiment of my invention is not to be construed as limiting my invention to lessen the scope of the following appended claims.

I claim:

1. A process for the conversion of n-butane to isobutane which comprises introducing liquid n-butane feed at a temperature in the region of its boiling point into contact with a bed of aluminum chloride catalyst at a higher elevation than the main body of catalyst in said bed whereby liquid n-butane flows downward through the catalyst effecting conversion to isobutane; passing vaporous effluent comprising isobutane, n-butane, and aluminum chloride to a rectifying zone; removing a vaporous effluent comprising concentrated isobutane substantially free from aluminum chloride from the rectifying zone; condensing at least a part of said vaporous effluent; returning condensate to the rectifying zone effecting condensation of the aluminum chloride and at least part of the n-butane; returning the condensed aluminum chloride and n-butane into contact with the catalyst; withdrawing a stream of liquid hydrocarbons, substantially free from aluminum chloride, from an intermediate point in said rectifying zone; heating said liquid hydrocarbons to vaporize at least a portion thereof, and passing said heated hydrocarbons into contact with the aluminum chloride catalyst at a lower elevation than the main body of the catalyst in said bed whereby the hydrocarbon vapors rise through the catalyst countercurrent to the liquid n-butane feed.

2. A process for the conversion of n-butane to isobutane which comprises introducing n-butane at a temperature in the region of its boiling point into contact with a bed of solid aluminum halide catalyst in a reaction zone, passing vaporous effluents of said reaction zone comprising n-butane, isobutane, and vaporous aluminum halide to a rectifying zone, removing a vaporous effluent comprising isobutane substantially free from aluminum halide vapors overhead from said rectification zone, condensing at least a part of the vaporous effluent from the rectifying zone and returning condensate to the rectifying zone effecting condensation of aluminum halide and at least a part of the n-butane, returning the condensed aluminum halide and n-butane to the reaction zone, withdrawing from an intermediate point in said rectifying zone a stream of hydrocarbons comprising n-butane substantially free from aluminum halide, heating said hydrocarbons to vaporize at least a portion thereof, and passing said heated hydrocarbons to said reaction zone to supply vapors for rectification.

3. The process of claim 2 in which the catalyst is aluminum chloride, and in which a portion of the n-butane feed is contacted with aluminum chloride in a separate zone, prior to contact with the bed of aluminum chloride catalyst, to incorporate aluminum chloride in said feed.

ANCEL B. LEONARD.